Figure 1:
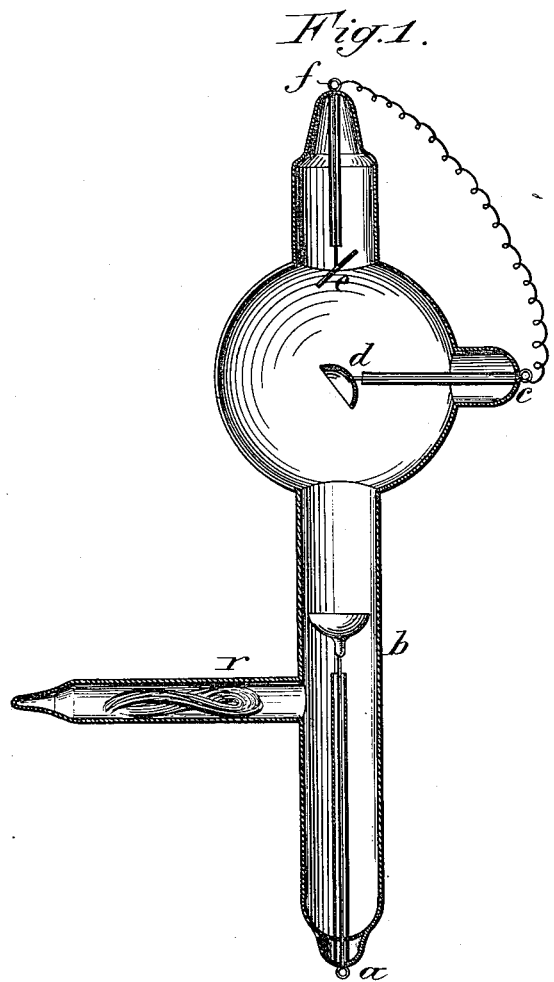

No. 751,304. PATENTED FEB. 2, 1904.
M. KROUCHKOLL.
ELECTRIC VACUUM DISCHARGE TUBE.
APPLICATION FILED MAY 26, 1902.
NO MODEL. 2 SHEETS—SHEET 1.

Witnesses:
Inventor:
Michel Krouchkoll
per B. Singer,
Attorney

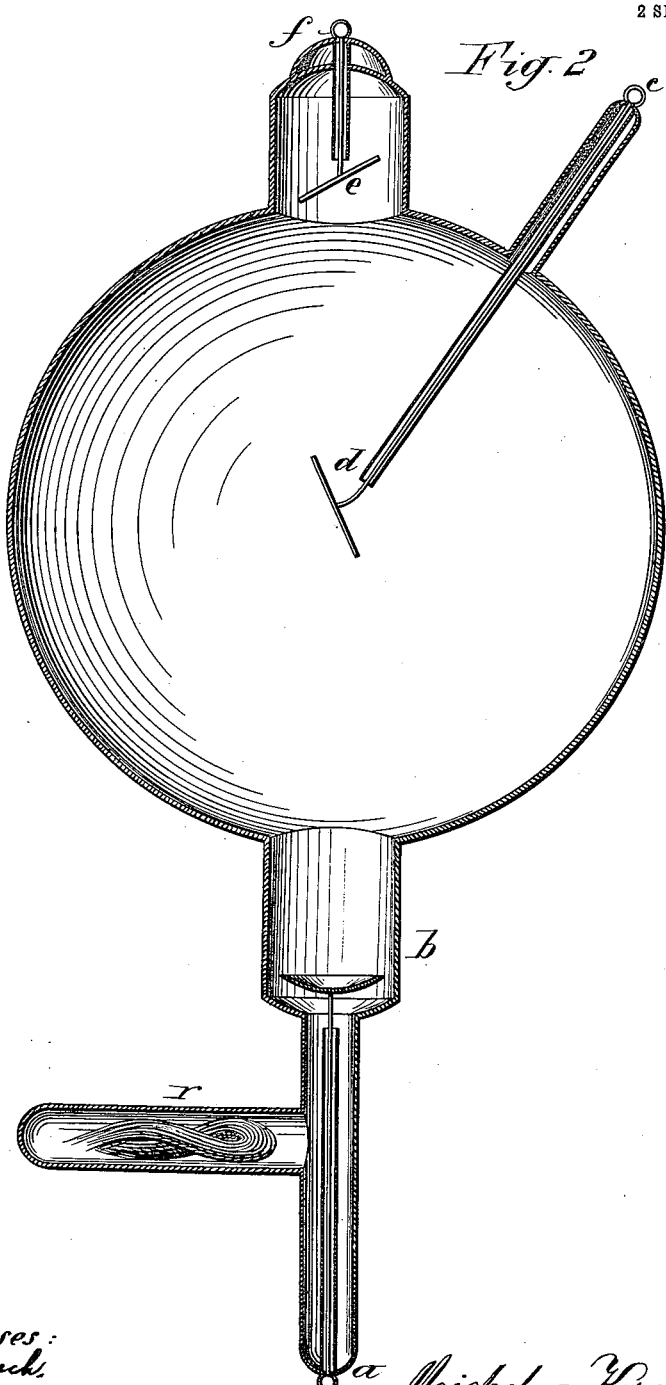

No. 751,304. Patented February 2, 1904.

UNITED STATES PATENT OFFICE.

MICHEL KROUCHKOLL, OF PARIS, FRANCE.

ELECTRIC VACUUM DISCHARGE-TUBE.

SPECIFICATION forming part of Letters Patent No. 751,304, dated February 2, 1904.

Application filed May 26, 1902. Serial No. 109,043. (No model.)

*To all whom it may concern:*

Be it known that I, MICHEL KROUCHKOLL, a citizen of the French Republic, and a resident of Paris, France, have invented certain new and useful Improvements in and Relating to Electric Vacuum Discharge-Tubes, of which the following is a specification.

This invention relates to improvements in and relating to electric vacuum discharge-tubes, and has for its object the better regulation of the vacuum to be obtained in tubes containing rarefied gases and the adaptation of means for rehabilitating the action of the tube under electric discharge after it has become sluggish or partially inoperative.

In the accompanying drawings, Figure 1 is a view showing the preferred form of device embodying this invention. Fig. 2 is a similar view showing a modified form of construction.

It is well known that capillary tubes of glass or other material retain gas even in a rarefied containing-chamber and that they only part with such gas with great difficulty under the action of a temperature more or less elevated. In the same way threads of glass or minute fragments of glass or other substances retain gas upon their surfaces or within adjoining interstices and do not part with it even in a rarefied atmosphere except under the action of heat. It is this property of capillary tubes and of threads or minute fragments of glass or other material that I utilize for the regulation of the vacuum in tubes containing rarefied gases—such as the tubes of Geissler, Crookes, or Roentgen, which are used for the production of X-rays and the like—whatever may be the form or the size of these well-known tubes or bulbs. In the case of any one of these tubes or bulbs I adapt to such tubes in any convenient manner either to the interior or the exterior, but communicating in some way with its interior, one, two, or more capillary tubes or equivalently one or more tubes or receptacles mounted on, within, or connected to the main tube and containing a suitable number of threads or of minute fragments, as aforesaid. These capillary tubes, threads, or minute fragments serve to vary and regulate the degree of rarefaction of the containing-receptacle not only by the fact of their presence but by the variation of temperature that they undergo or may be made to undergo as desired.

The annexed drawings illustrate by way of example two tubes in Figs. 1 and 2 constructed according to my invention.

It is to be seen that that which distinguishes my tubes from ordinary tubes is the regulator and the therein-contained capillary tubes, threads, or minute fragments of glass or other substance. In the examples shown the regulator contains glass threads.

Fig. 2 shows an exemplification of the inventive idea differing from Fig. 1 in that the regulator in Fig. 2 depends mainly on the glass filaments, whereas in Fig. 1 the finely-drawn-out end of the regulator $r$ also acts as a gas-reservoir. Then again it is shown that in the polar connections flat disks can be used for anticathode as well as the concave end pieces used in Fig. 1.

In operation when it is desired to lower the degree of rarefaction in the tube the branch tube $r$ containing the filaments of glass is heated by any well-known means, and the gases adhering to said filaments of glass will be thrown off, as desired.

$a\,b$ represent the cathode, $c\,d$ the anticathode, and $e\,f$ a complementary anode, which in ordinary use is connected electrically to the anticathode, but which will serve to rehabilitate the tube if it should become sluggish or inoperative. For this latter purpose it suffices to transfer the cathode from $a$ to $f$ after having insulated $c$ and $f$, thus passing the discharge between $d$ and $e$. The tube will be readily rehabilitated by the passage of the discharge in this manner.

It is to be understood that the drawings represent only convenient examples and that the form, arrangement, and dimensions of the tubes and of the regulator may be varied without departing from the essence of my invention.

Having now fully described my said invention, what I claim, and desire to secure by Letters Patent, is—

1. In an electric vacuum discharge-tube, the combination with the main tube, of capillary tubes, threads or minute fragments of glass suitably disposed within said main tube, for the purpose of regulating the degree of rarefaction therein, substantially as described.

2. In an electric vacuum discharge-tube, the combination with the main tube, of an auxiliary tube or receptacle in communication therewith, and capillary tubes, threads or minute fragments of glass disposed in said auxiliary tube and adapted to regulate the degree of rarefaction in the main tube, substantially as described.

In testimony whereof I have hereunto set my hand in presence of two witnesses.

MICHEL KROUCHKOLL.

Witnesses:
ADOLPHE STURM,
EDWARD P. MACLEAN.